3,052,487
Patented Sept. 4, 1962

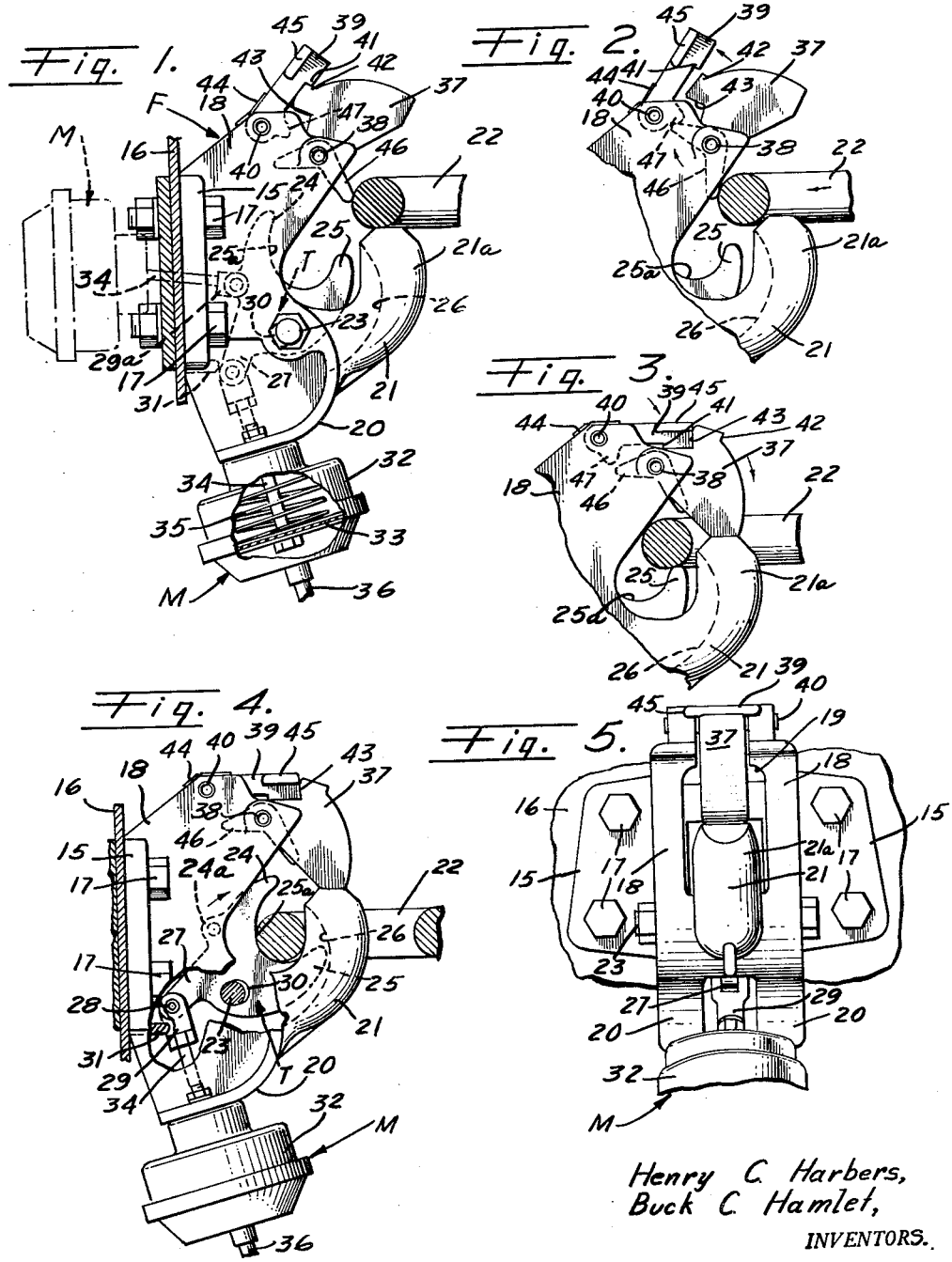

1

3,052,487
TRAILER HITCH
Henry C. Harbers, Pasadena, and Buck C. Hamlet, La Puente, Calif., assignors to Western Unit Corporation, Los Angeles, Calif., a corporation of California
Filed Sept. 21, 1959, Ser. No. 841,130
8 Claims. (Cl. 280—506)

Our invention relates to hitches for coupling trailers to trucks which embody a coupling member on the truck in the form of a pintle hook, and a second coupling member in the form of an eye which is on the draw bar of the trailer and loosely receives the pintle hook to facilitate coupling and uncoupling of the members.

Our invention particularly relates to the shockless type of hitches disclosed in our copending application Ser. No. 771,662 filed November 3, 1958, now abandoned, and it has for its purpose the provision of a hitch which provides the same advantages but in a more efficient manner and by a structure greatly simplified thereover so that it can be manufactured at less cost and more readily assembled, and yet does not sacrifice any of the functional advantages of our prior hitches such as constantly absorbing all slack between the coupling members, particularly in the line of draft between the truck and the trailer, and thereby preventing looseness occurring between the members as the result of wear, and also to minimize frictional wear between the members.

It is also a purpose of our invention to provide a trailer hitch which embodies a tumbler that is operable by a motor to exert a constant pressure of the coupling eye against the pintle hook and substantially along the line of draft between the truck and trailer, the tumbler being mounted on a shiftable pivot which allows limited movement thereof to engage a boss for holding the tumbler in a position to assist and permit uncoupling of the eye from the hook.

A further purpose of our invention is the provision of a hitch which embodies a locking member and a latch therefor which is operable to maintain the locking member in a position allowing coupling of the eye on the pintle hook, and to secure the member in spanning position with respect to the pintle hook such as to maintain the eye coupled thereon against accidental displacement therefrom.

Another purpose of our invention is to provide means actuatable by the eye in its movement onto the pintle hook for automatically moving the latch to release the locking member so that it can fall into pintle-hook closing position, and to allow the latch to secure the locking member in such position.

We will describe only one form of trailer hitch embodying our invention, and will then point out the novel features thereof in claims.

In the accompanying drawings:

FIG. 1 is a view showing in side elevation and partly in section one form of trailer hitch embodying our invention with the parts thereof in position for coupling of the eye to the pintle hook.

FIG. 2 is a fragmentary view partly in section and similar to FIG. 1, but showing the eye in the act of passing onto the pintle hook, and how the locking member and latch are moved by the eye to effect release of the locking member.

2

FIG. 3 is a view similar to FIG. 2 showing the eye after it has passed onto the pintle hook, and the locking member moved to lowered position and secured therein by the latch to retain the eye against displacement from the pintle hook.

FIG. 4 is a view similar to FIG. 1 showing the tumbler of the hitch after it has been moved by the motor to press the eye against the pintle of the hook.

FIG. 5 is a rear elevational view of the hitch in the coupled position shown in FIG. 4 and with the eye omitted.

Referring more particularly to the drawings, the trailer hitch comprises a frame, generally indicated at F, which includes a pair of coplanar plates 15 secured to the rear side of a frame part 16 of the chassis of a truck, by means of bolts 17. Cast integral with the confronting vertical edges of the plates 15 and extending rearwardly therefrom is a pair of vertical plates 18 which, as better shown in FIG. 5, are spaced one from the other to provide an intervening opening 19, but are connected one to the other at their lower ends where they are provided with extensions 20 which provide a mounting for an air motor which will be described hereinafter.

Cast integral with the plates 18 and extending rearwardly therefrom is a pintle hook 21, the bill 22a of which extends upwardly to provide the pintle. As will be understood the pintle hook constitutes that coupling member of the hitch carried by the rear end of the truck, the other coupling member of the hitch comprising an eye 22 which is formed on the forward end of a drawbar (not shown) that is carried by the forward end of a trailer.

By means of a bolt 23 which extends transversely through the plates 18, a tumbler, generally indicated at T, is pivotally mounted between the plates so as to occupy those positions necessary to permit coupling and uncoupling of the eye 22 to and from the pintle hook 21; to exert pressure on the eye to hold the same in firm contact with the pintle 21a along the line of draft between the two vehicles; and to elevate the eye on the pintle so that it can be removed therefrom.

The tumbler T is constructed to provide an upper tongue 24 and a lower tongue 25 which is adapted to be accommodated within the pintle hook 20 when in the lowered position shown in FIG. 4 through the provision of a recess 26 in the pintle hook. These tongues 24 and 25 are spaced one from the other to provide an intervening recess 25a in which the forward end of the eye 22 can be accommodated when the eye is in coupled relation to the pintle.

The tumbler T is also formed with a downwardly extending arm 27 which, by a pin 28, is pivotally connected to the upper end of a clevis 29. At this point it will be noted that the opening 30 in the tumbler through which the pivot bolt 23 extends is not circular but elongated for the purpose of allowing shifting movement of the tumbler upwardly to cause the free end of the arm 27 to be extended above a boss 31 on and between the lower end of the plates 18, or shifting movement downwardly to cause the free end of the arm 27 to pass beneath and into engagement with the boss 31 for holding the tumbler in the position shown in FIG. 1.

The tumbler T is adapted to be rotated in one direction or the other about the bolt pivot 23 to occupy the positions necessary to coupling and uncoupling of the eye from the pintle, through the provision of a conventional form of air motor M which, as shown in FIG. 1, comprises a casing 32 suitably fixed to the extensions 20, and containing a diaphragm 33 to which one end of a rod 34 is connected so as to extend outwardly and upwardly from one side of the casing where it is connected to the clevis 29. A coiled spring 35 within the casing 32 urges the diaphragm 33 downwardly to move the rod 34 to the lowered position shown in FIG. 1.

Air under pressure can be supplied to the casing 32 by a pipe 36 for flexing the diaphragm against the tension of the spring 35 to move the rod 34 upwardly, it being understood that when the casing is relieved of air pressure the spring operates to move the rod downwardly. It will, of course, be understood that the pipe 36 is connected to a source of air pressure (not shown) from which air can be delivered to the motor casing under the control of a suitable valve to flex the diaphragm as required.

To permit the eye 22 to be coupled to the pintle 21a, and to prevent accidental uncoupling thereof, a locking member 37 is pivoted on a pin 38 between the plates 18 to occupy the elevated position shown in FIGS. 1 and 2 and the lowered position shown in FIGS. 3 and 4. A latch 39 is provided for latching the locking member in both elevated and lowered positions, and this latch is pivoted on a pin 40 extending between the plates 18, and it is formed with a transverse shoulder or tooth 41 on its lower side adjacent its free end.

The tooth 41 is adapted to engage a transverse shoulder or tooth 42 on the locking member 37 for latching the member in the elevated position, or to engage a shoulder 43 on the latching member in lowered position to releasably secure the member in lowered position wherein it spans the space between the free end of the pintle 21a and the plates 18 to close the pintle hook and thus prevent accidental uncoupling of the eye 22 therefrom.

The latch 39 is urged in a clockwise direction about its pivot by means of a leaf spring 44 fixed to the upper edges of the plates 18 so as to hold it in either elevated or lowered position. The latch 39 is adapted to be manually lifted from the lowered position shown in FIG. 4 to the elevated position shown in FIG. 1, and for this purpose a pair of flanges 45 is formed on the free end of the latch so as to extend to opposite sides thereof.

For automatically lifting the latch 39 from the position shown in FIG. 1 to that shown in FIG. 2, so as to release the locking of member 37 so that it can drop to the position shown in FIG. 3, a bell crank lever 46 is fulcrumed on the pin 38 so that the lower arm thereof is disposed in the path of movement of the eye 22 to be engaged by the latter as it passes onto the pintle 21a in a coupling operation, and to thus elevate the upper arm of the lever to engage a boss 47 on the latch 39 and thus lift the latter against the tension of the spring 44 to a position in which the tooth 41 disengages the tooth 42 thereby permitting the locking member 37 to drop the hook-closing position.

The operation of the hitch to effect coupling and uncoupling of the eye and pintle is as follows:

In order to initiate coupling of the eye 22 to the pintle hook 21, it is first necessary that air under pressure be exhausted from the casing 22 so that the spring 35 can move the rod 34 downwardly to swing the tumbler T in a counterclockwise direction and to the position shown in FIG. 1. In this position the free end of the arm 27 has passed to the lower side of the boss 31 thus holding the tumbler against possible rotation in the other direction so that the tongue 25 is retained in the elevated position shown in FIG. 1. Also, the latch 39 must be manually lifted to the elevated position shown in FIG. 1, and which, through the interengagement of the teeth 41 and 42, lifts the locking member 37 to an elevated position to open the pintle hook 21 for insertion of the eye 22.

To insert the eye 22 it is manually lifted to the position shown in FIG. 1 wherein it rests on the upper end of the pintle 21a so that by movement of the truck toward the trailer the eye will be caused to engage the lower arm of the lever 46 as it passes over the pintle, all in the manner illustrated in FIG. 2. Through such engagement the lever 46 is swung to the position shown in FIG. 2 thereby causing the other arm of the lever to strike the boss 47 and lift the latch 39 against the tension of the spring 44 to the elevated position shown in FIG. 2.

As the latch moves to this position the tooth 41 disengages the tooth 42 thereby allowing the locking member 37 to fall to the position shown in FIG. 3 in which its free end reposes on the upper end of the pintle 21a and concurrently with movement of the eye 22 onto the pintle to rest on the upper end of the tongue 25.

As the eye moves onto the pintle it disengages the lever 46 allowing it to swing back to its initial position to disengage the boss 47 thus permitting the spring 44 to swing the latch downwardly to horizontal position as illustrated in FIG. 3 wherein its free end abuts the shoulder 43 to secure the locking member in lowered position in which it spans the space between the forward edges of the plates 18 and the pintle to confine the eye on the pintle against any possible displacement therefrom.

Once the eye 22 is coupled to the pintle 21a the operator now supplies air under pressure to the casing 32 through the pipe 36 to flex the diaphragm 33 upwardly against the tension of the spring 35 so as to move the rod 34 upwardly and thereby swing the tumbler T in a clockwise direction to the position shown in FIG. 4. In this position the tongue 25 is lowered into the recess 26 while the tongue 24 is moved to engage and press the eye 22 against the pintle 21a. The pressure exerted by the tongue 24 on the eye is substantially in a direction along the line of draft between the truck and the trailer so as to prevent any play between the eye and pintle and thus eliminate shock and relative longitudinal movement of the truck and trailer as so coupled.

It will be noted that during actuation of the tumbler T to exert pressure on the eye 22 to maintain it against the pintle 21a, the free end of the arm 27 will, under shifting movement of the tumbler upwardly by virtue of the elongated opening 30, pass from the underside of the boss 31 to the upper side thereof as illustrated in FIG. 4, and thus the boss does not interfere with movement of the tumbler to this position.

To uncouple the eye from the pintle the latch 39 is first lifted back to the position shown in FIG. 1 followed by lifting of the locking member 37 to a position which, when the latch is released, causes re-engagement of the teeth 41 and 42 to hold the locking member in elevated or open position. These operations are followed by exhausting air from the casing 32 to relieve the diaphragm 33 of air pressure thereby allowing the spring 35 to return the tumbler to the position shown in FIG. 1 during which the tongue 25 is lifted to elevate the eye 22 to the position shown in FIG. 3, wherein it reposes on the upper end of the tongue so that by slight forward movement of the hitch the eye is completely uncoupled from the pintle.

The construction and mode of operation of our hitch permits, should it be desired, location of the motor M at the forward side of the hitch as illustrated in broken lines in FIG. 1. As so located the rod 34 can be pivotally connected through the clevis 29 to an ear 24a on the forward edge of the tongue 24. As so connected the motor can operate the tumbler in the same manner as described in connection with the motor M when located below the hitch.

Although we have herein shown and described only one form of trailer hitch embodying our invention, it is to be understood that various changes and modifications may be made herein without departing from the

What we claim is:

1. A trailer hitch, including: a frame, an upwardly projecting pintle hook fixed on the frame and having the upper end thereof spaced from the frame to permit coupling and uncoupling of an eye thereto; a tumbler; shiftable means pivoting the tumbler on the frame for rotation in one direction to occupy a first position supporting said eye for disengagement from said pintle, and in the other direction to occupy a second position permitting engagement of said eye to the pintle, and once coupled to exert pressure on said eye to press the eye against the pintle until rotation of the tumbler in the first-mentioned direction; a boss on the frame; said shiftable means allowing downward movement of the tumbler in the plane thereof when rotated to said first position so as to engage the boss therebeneath thereby causing the latter to hold the tumbler in said position to permit uncoupling of said eye from the pintle, and said means also allowing movement upwardly of the tumbler in the plane thereof under rotation to said second position to disengage the boss, thus allowing rotation of the tumbler to the second position; and second means carried by the frame for driving said shiftable means.

2. A trailer hitch as embodied in claim 1, wherein a member is pivoted on the frame to occupy an elevated position in which it clears the space between the frame and the pintle to allow coupling of the pintle to the eye, and a lowered position to which it can gravitate and bridge said space; a latch pivoted on the frame to occupy lowered and elevated positions; a spring for urging the latch to lowered position; coacting means on the latch and the member operable when the latch is moved to elevated position for holding the member in elevated position; and a second coacting means on the latch and the member operable under the urging action of the spring when the latch is in lowered position for holding the member in lowered position.

3. A trailer hitch as embodied in claim 1, wherein a member is pivoted on the frame to occupy an elevated position in which it clears the space between the frame and the pintle to allow coupling of the pintle to the eye, and a lowered position to which it can gravitate and bridge said space; a latch pivoted on the frame to occupy lowered and elevated positions; a spring for urging the latch to lowered position; coacting means on the latch and the member operable when the latch is moved to elevated position for holding the member in elevated position; a second coacting means on the latch and the member operable under the urging action of the spring when the latch is in lowered position for holding the member in lowered position; and an element pivoted on the frame having one part extending into the space between the frame and the pintle for engagement by the eye in a coupling operation to actuate the latch against the action of the spring to lift the latch beyond its elevated position to cause the first-mentioned coacting means and release the member when in elevated position so that it can fall to lowered position.

4. A trailer hitch as embodied in claim 1, wherein a member is pivoted on the frame to occupy an elevated position spaced remotely from the upper end of said pintle thereby to permit engagement of a coupling eye over said pintle and to gravitate to a lowered position in which it blocks engagement of a coupling eye over said pintle; a tooth on the member; a shoulder on the member; a latch pivoted on the frame to occupy an elevated position and a lowered position; a tooth on the latch; a shoulder on the latch; a boss on the latch; a spring on the frame for urging the latch to lowered position and for holding it in an elevated position such that the teeth on the latch and member engage each other to maintain the member in elevated position; and a bell crank lever fulcrumed on the frame and having one arm normally disposed in said space between said upper end and said frame so as to be moved by the eye during a coupling operation to cause the other arm thereof to engage the boss and swing the latch to a position in which its tooth disengages the tooth of the member to allow the member to fall to lowered position in which the latch shoulder engages the member shoulder to secure the member in lowered position.

5. A trailer hitch having a frame, including: a pintle hook fixed on said frame with the end thereof spaced from the frame to permit coupling and uncoupling of an eye thereto; a tumbler having upper and lower tongues spaced from each other; shiftable means pivoting the tumbler on the frame for rotation in one direction to occupy a first position in which said tongues are located so that said eye can be disengaged from the pintle, and in the other direction to occupy a second position to receive the eye between said tongues so that the eye can be coupled to the pintle, and once coupled to exert pressure on said eye to press the eye against the pintle by the upper tongue until rotation of the tumbler in the first-mentioned direction, and when returned to the first position causing the lower tongue to elevate the eye to a position permitting uncoupling thereof from the pintle; a boss on the frame; said means allowing movement of the tumbler in the plane thereof when rotated to said first position so as to engage the boss therebeneath thereby causing the latter to hold the tumbler in said first position to permit uncoupling of said eye from the pintle, and said means also allowing movement upwardly of the tumbler in the plane thereof under rotation toward said second position to disengage the boss, thus allowing rotation of the tumbler to the second position; and means carried by the frame for rotating the tumbler to any of said positions.

6. In a trailer hitch: a frame; a pintle hook fixed on the frame and having the pintle thereof spaced from the frame to allow an eye to be coupled or uncoupled therefrom; a member pivoted on the frame to occupy an elevated position clearing said space to allow coupling of the eye to the pintle, and to gravitate to a lowered position spanning said space to confine the eye on the pintle; a latch pivoted on the frame to occupy lowered and elevated positions; a spring on the frame for urging the latch to lowered position; coacting means on the latch and the member for securing the member in lowered position when the latch is in lowered position; a second coacting means on the latch and the member for securing the member in elevated position by and when the latch is in elevated position; and a bell crank lever fulcrumed on the frame and having one arm thereof normally disposed within said space so as to be engaged by the eye during a coupling operation and moved so as to cause the other arm thereof to lift the latch and thus cause the second coacting means to release the member so that it can fall to lowered position.

7. In a trailer hitch: a frame; a pintle hook fixed on the frame with the pintle thereof spaced from the frame; a member pivoted on the frame to occupy an elevated position in which it clears the space between the frame and the pintle to allow coupling of the pintle and eye, and a lowered position to which it gravitates and bridges said space; tooth means on the member; a latch pivoted on the frame to occupy lowered and elevated positions and having tooth means on the free end thereof and selectively engageable with the member tooth to hold the member either lowered or raised; a boss on the latch; a spring on the frame for urging the latch to lowered position; and a bell crank lever pivoted on the frame, one arm of the lever normally disposed within said space so as to be engageable by the eye in a coupling operation to move the other arm of the lever so as to engage the boss and lift the latch to elevated position in which the latch tooth disengages the member tooth to allow the member to drop to lowered position.

8. A trailer hitch, including: a frame; a pintle hook fixed on the frame and having the pintle thereof spaced from the frame to permit coupling and uncoupling of an eye thereto; a member pivoted on the frame to occupy an elevated position in which it clears the space between the frame of the pintle to allow coupling of the pintle and eye, and a lowered position to which it gravitates and bridges said space; a latch pivoted on the frame for holding the member in lowered position and manually liftable to an elevated position permitting the member to be manually lifted to elevated position in which it is retained by the elevated latch; and an element movably mounted on the frame and extending into the space between the frame and the pintle for engagement by the eye in a coupling operation thereby moving said element to disengage the latch from the member allowing the latter to fall to the lowered position thereof.

References Cited in the file of this patent

UNITED STATES PATENTS

| | | |
|---|---|---|
| 1,411,230 | Weber | May 28, 1922 |
| 1,860,973 | Yeakel | May 31, 1932 |
| 2,295,021 | Weiss | Sept. 8, 1942 |
| 2,522,791 | Ketel | Sept. 19, 1950 |
| 2,812,716 | Gray | Nov. 12, 1957 |
| 2,842,380 | Weiss | July 8, 1958 |